(12) United States Patent
Knoedgen

(10) Patent No.: US 7,509,113 B2
(45) Date of Patent: Mar. 24, 2009

(54) MONOLITHIC OPTICAL AUTOCOMPENSATION READ-OUT CIRCUIT FOR PRECISE REFLECTION MEASUREMENTS OF DISTANCES

(75) Inventor: Horst Knoedgen, Munich (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 11/893,818

(22) Filed: Aug. 16, 2007

(65) Prior Publication Data

US 2007/0298845 A1   Dec. 27, 2007

Related U.S. Application Data

(62) Division of application No. 10/361,876, filed on Feb. 10, 2003, now Pat. No. 7,260,422.

(30) Foreign Application Priority Data

Feb. 6, 2003   (EP) .................................. 03368011

(51) Int. Cl.
  *H04B 1/16*   (2006.01)
  *H01J 40/14*   (2006.01)
(52) U.S. Cl. ..................... 455/334; 250/214 A; 398/202
(58) Field of Classification Search .............. 250/208.1, 250/214 A, 214 R, 214 P, 214 D, 214 DC, 250/214.1, 216; 330/59, 307, 308, 277, 3, 330/7; 398/202; 455/323, 333, 334, 341
See application file for complete search history.

(56) References Cited

U.S. PATENT DOCUMENTS

| 3,770,968 | A | * | 11/1973 | Hession et al. .......... 250/214 R |
| 4,647,762 | A | * | 3/1987 | Chown .................... 250/214 A |
| 4,701,048 | A | * | 10/1987 | Tokuda et al. .............. 356/3.08 |
| 4,745,274 | A | * | 5/1988 | Muro ...................... 250/214 R |
| 4,750,217 | A | * | 6/1988 | Smith et al. .................. 398/203 |
| 4,751,745 | A | * | 6/1988 | Price .......................... 398/202 |
| 4,808,810 | A | * | 2/1989 | Van Doorn .............. 250/214 A |
| 5,239,402 | A | * | 8/1993 | Little et al. .................. 398/202 |
| 5,389,776 | A | * | 2/1995 | Woodward ............ 250/214 LS |
| 5,654,537 | A | * | 8/1997 | Prater ...................... 250/208.1 |
| 5,729,604 | A | | 3/1998 | Van Schyndel |
| 5,822,099 | A | | 10/1998 | Takamatsu |
| 6,236,037 | B1 | | 5/2001 | Asada et al. |
| 6,242,728 | B1 | | 6/2001 | Merrill et al. |
| 6,313,457 | B1 | | 11/2001 | Bauer et al. |

(Continued)

FOREIGN PATENT DOCUMENTS

EP          0 564 160 A2       10/1993

(Continued)

*Primary Examiner*—Blane J Jackson
(74) *Attorney, Agent, or Firm*—Saile Ackerman LLC; Stephen B. Ackerman

(57) ABSTRACT

A circuit and method are given, to realize a loudness control for mobile phone earpieces and speakers with the help of a proximity sensor, which is realized as an infrared photoelectric guard circuit, where only very few external parts are needed. As a novelty here, the necessary photo sensors are integrated onto a single chip. To form the photodiodes within a single IC together with the other circuit elements are much less expensive. Using the advantages of that solution the circuit of the invention is manufactured with standard CMOS technology and only very few discrete external components. This solution reduces also power consumption and manufacturing cost.

24 Claims, 5 Drawing Sheets

U.S. PATENT DOCUMENTS

| | | | |
|---|---|---|---|
| 6,323,479 B1 * | 11/2001 | Hynecek et al. | 250/214 L |
| 6,337,678 B1 | 1/2002 | Fish | |
| 6,492,650 B1 | 12/2002 | Imai et al. | |
| 6,660,991 B2 * | 12/2003 | Brombacher et al. | 250/214 R |
| 6,690,000 B1 * | 2/2004 | Muramatsu et al. | 250/208.1 |
| 2002/0024058 A1 | 2/2002 | Marshall et al. | |
| 2002/0068537 A1 | 6/2002 | Shim et al. | |
| 2004/0253994 A1 | 12/2004 | Lampl et al. | |

FOREIGN PATENT DOCUMENTS

| | | |
|---|---|---|
| WO | WO 00/79766 A1 | 12/2000 |
| WO | WO 01/00459 A1 | 1/2001 |

* cited by examiner

*FIG. 1A - Prior Art*

MONOLITHIC OPTICAL AUTOCOMPENSATION READ-OUT CIRCUIT FOR PRECISE REFLECTION MEASUREMENTS OF DISTANCES

DIVISIONAL PATENT APPLICATION

This is a Divisional application of U.S. patent application Ser. No. 10/361,876 filed on Feb. 10, 2003 now U.S. Pat. No. 7,260,422, which is herein incorporated by reference in its entirety, and assigned to a common assignee

BACKGROUND OF THE INVENTION (1) Field of the Invention

The invention relates generally to electronic circuits within optical read-out systems and in particular to interfaces for operating light emitting diodes (LED) in conjunction with photo diodes realized with integrated-circuit technologies.

(2) Description of the Prior Art

Special interface and driver circuits in electronic applications are required, when it comes to operating LEDs and photo diodes within control systems, where a photo sensor measures the emitted radiation from a photon source and the result of this operation is further processed in subsequent control circuits. This is a noted and quite common application of such electronic components very frequently employed in many industrial systems; for example for monitoring and surveillance purposes with light barriers within a process control of plants, for distance/thickness measuring, for touch or biometric sensor systems, for position detection systems, or for remote control systems, wireless data transmission systems and so on. Therefore the reliable and cost-effective manufacturing of such circuits, at its best containing all the necessary components within one single integrated circuit is a desirable demand.

Realizations of the prior art for such systems are often implemented as specifically assembled semiconductor circuit systems, consisting of integrated control circuits combined with separate, externally adapted photo devices considering the specific operational requirements. Therefore, when photo diodes as sensor devices are used, the configuration shown in FIG. 1A prior art is commonly used. As photo sensor a discrete photo diode component, connected to its supply voltage $V_D$ (Photo diode) is used, further connected via a pad/pin to the evaluation electronics circuit (IC), containing the operational amplifier for the photo currents with its necessary stabilizing feedback resistor, eventually ameliorating its dynamic behavior with a capacitor (Amplifier), also containing the signal processing part for the particular control functions (Control) supplying the output signal of the circuit (Output). This configuration is realizing only the photo sensor input part of the abovementioned, widely used prior art control systems. As can be seen from this example, beneath specialized integrated circuits usually incorporating CMOS (Complementary MOS) devices always some additional external and discrete components are employed, which are normally realized with other semiconductor technologies. In some cases there is additional on chip AC coupling employed, using an extra band pass filter. All this leads to more complex and thus expensive solutions. It is therefore a challenge for the designer of such circuits to achieve a high quality, but lower-cost solution.

There are several efforts and labors with various patents referring to such approaches.

U.S. Pat. No. 5,822,099 (to Takamatsu) describes a light communication system employing light, such as infrared rays, in which power consumption required for light communication is diminished for prolonging the service life of portable equipments and for reducing interference or obstruction affecting other spatial light communication operations. A light emitting element in a transmission portion of a first transmission/reception device is controlled in light emission by a light emission driving control circuit and has its light emission intensity adjusted by a light emission intensity adjustment circuit in a light emission drive control circuit. The light reception intensity in a light receiving element of a receiving portion of a second transmission/reception device is detected by a reception light intensity detection circuit in a light signal reception processing circuit and sent via a transmission driving control circuit and a transmitting portion so as to be received by a reception portion of the first transmission/reception device. The reception light intensity information is taken out by a reception processing circuit and supplied to the light emission intensity adjustment circuit. The light emission intensity adjustment circuit is responsive to the reception light intensity information to adjust the light-emitting element to a light emission intensity that is of a necessary minimum value to permit stable light communication.

U.S. Pat. No. 6,236,037 (to Asada, et al.) shows finger touch sensors and virtual switch panels for detecting contact pressure applied to a finger, the finger having a fingernail illuminated by light, comprises at least one photo detector for measuring a change in light reflected by an area of the finger beneath the fingernail in response to the contact pressure applied to the finger. The photo detector provides a signal corresponding to the change in light reflected. The device also includes a processor for receiving the signal and determining whether the change corresponds to a specified condition. The photo detector may be enclosed in a housing and coupled to the fingernail.

U.S. Pat. No. 6,337,678 (to Fish) explains a force feedback computer input and output device with coordinated haptic elements, where a set of haptic elements (haptels) are arranged in a grid. Each haptel is a haptic feedback device with linear motion and a touchable surface substantially perpendicular to the direction of motion. In a preferred embodiment, each haptel has a position sensor, which measures the vertical position of the surface within its range of travel, a linear actuator that provides a controllable vertical bi-directional feedback force, and a touch location sensor on the touchable surface. All haptels have their sensors and effectors interfaced to a control processor. The touch location sensor readings are processed and sent to a computer, which returns the type of haptic response to use for each touch in progress. The control processor reads the position sensors, derives velocity, acceleration, net force and applied force measurements, and computes the desired force response for each haptel. The haptels are coordinated such that force feedback for a single touch is distributed across all haptels involved. This enables the feel of the haptic response to be independent of where touch is located and how many haptels are involved in the touch. As a touch moves across the device, haptels are added and removed from the coordination set such that the user experiences an uninterrupted haptic effect. Because the touch surface is comprised of a multiple haptels, the device can provide multiple simultaneous interactions, limited only by the size of the surface and the number of haptels. The size of the haptels determines the minimum distance between independent touches on the surface, but otherwise does not affect the properties of the device. Thus, the device is a pointing device for graphical user interfaces, which provides dynamic haptic feedback under application control for multiple simultaneous interactions.

U.S. Pat. No. 6,492,650 (to Imai, et al.) discloses a sensor unit for use in a multiple sensor unit array, which comprises a housing which is adapted to be mounted on a DIN rail closely one next to another as a sensor unit array, and to be connected to a sensor head via a cable. The housing accommodates a sensing circuit system for achieving a desired sensing function in cooperation with the sensor head, a first optical communication circuit system including a light emitting device and a light receiving device for conducting an optical bi-directional communication with one of the adjacent sensor units in the multiple sensor unit array, and a second optical communication circuit system including a light emitting device and a light receiving device for conducting an optical bi-directional communication with the other of the adjacent sensor units, whereby the sensor unit is enabled to conduct an optical bi-directional communication with each of the adjacent sensor units in the multiple sensor unit array.

SUMMARY OF THE INVENTION

A principal object of the present invention is to provide an effective and very producible method and circuit for controlling the loudness of an earpiece of a mobile phone in such a way, that unpleasant and harmful loudness levels are avoided for the user by exploiting an optical proximity sensing method.

A further important object of the present invention is to account for ambient light effects disturbing the photo reflective principle used.

Another further object of the present invention is to eliminate aging and drift effects in the photo sensible and effective components.

Another still further object of the present invention is to reach a cost reduced method of manufacture.

A still further object of the present invention is to reduce the power consumption of the circuit by realizing inherent appropriate design features.

Another object of this invention is its manufacturability as a monolithic semiconductor integrated circuit.

Also an object of the present invention is to reduce the cost of manufacturing by implementing the circuit as a monolithic integrated circuit in low cost CMOS technology.

Also another object of the present invention is to reduce cost by effectively minimizing the number of expensive components.

In accordance with the objects of this invention, a method for realizing a loudness control with the circuit of the invention is given as described and explained before. Said method includes the driving of a sound generating loudspeaker system and establishing a secure threshold sound level. It then demands setting-up and driving a light emitting diode (LED) as primary photon source with pulses, following a step of establishing and driving two different photon sensing channels for accounting of temperature drift effects and ambient light effects with accordingly synchronized pulses. The method then continues with measuring the distance from a reflective surface (head and ear of user) by comparing input signals to said photo channels in periods, where the LED is ON (light) and where the LED is OFF (dark). Said method also comprises evaluating said signals accordingly taking into account said temperature and ambient light effects thus effectively compensating for all obnoxious side effects. Further includes said method comparing said measured distance to the correspondingly equivalent of the established secure sound level threshold value. As a result said method then decides according to the programmed logic with its primary goal, to reduce loudness if distance is small, i.e. the phone is close to ear. Finally the method is terminated by generating controlled sound output signals according to the result of the decision, thus avoiding unpleasant and harmful loudness levels.

Also in accordance with the objects of this invention, a circuit is described, capable of controlling the loudness of an earpiece of a mobile phone in such a way, that unpleasant and harmful loudness levels are avoided for the user by exploiting an optical proximity sensing method. Said circuit comprises means for generating photons as well as means for sensing photons. Also comprised are means for generating phonons and means for driving said phonon-generating system. Equally included in said circuit are means for common control of said means for generating photons, said means for sensing photons and said means for generating phonons.

Further in accordance with the objects of this invention, a circuit is given, capable of detecting and sensing photons and generating an appropriate output signal comprising a photo diode, a switching device, a field effect transistor, a current source driving said field effect transistor, and a control circuit for the processing of an intermediate output signal, delivered from said field effect transistor, thus generating said appropriate output signal of the circuit.

Equally in accordance with the objects of this invention, a circuit is shown, capable of detecting and sensing photons under consideration of side effects thus generating an appropriate output signal, comprising two sets of a basic photo sensitive circuit; each set comprising a photo diode, a switching device, a field effect transistor, a current source driving said field effect transistor, and a common differential amplifier for both sets, with a common control circuit for the processing of the output signals delivered from said operational amplifier, thus generating said appropriate output signal of the circuit.

BRIEF DESCRIPTION OF THE DRAWINGS

In the accompanying drawings forming a material part of this description, the details of the invention are shown:

FIG. 1A prior art shows the electrical circuit schematics of a photo sensor circuit as realization of the prior art. It is emphasized here, that the photodiode is located in a second semiconductor chip.

FIG. 1B is functionally corresponding to the circuit of FIG. 1A prior art.

DESCRIPTION OF THE PREFERRED EMBODIMENTS

The preferred embodiments disclose a novel circuit for photo sensor stages normally used in closed loop control systems, operating either with visible or invisible (e.g. infrared, IR) light, and a complete circuit including this photo sensor, also apt for manufacture as monolithic integrated semiconductor circuit (IC). Further disclosed in the preferred embodiments is the use of said new IC as an element in a telephone loudness regulation application and a method therefore.

A preferred embodiment of the invention is described now by explaining the circuit and a related method.

Figure 1B:
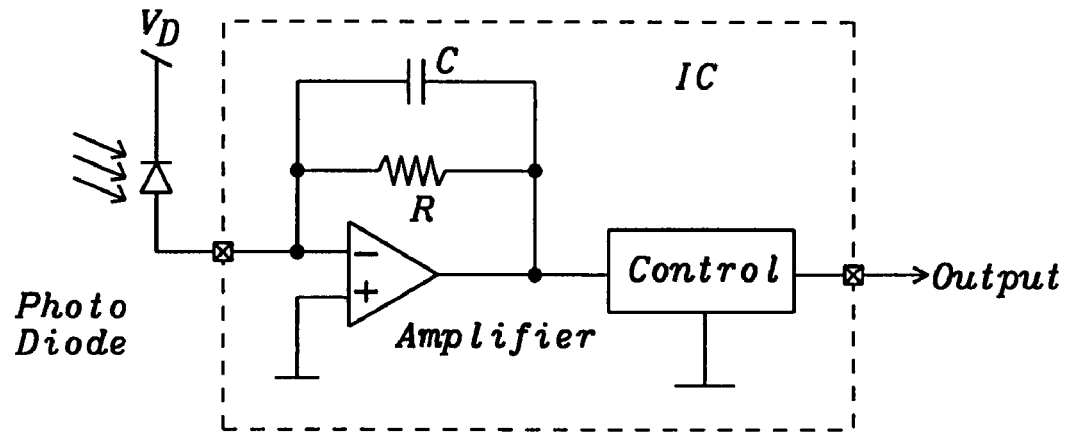
FIG. 1B presents the electrical circuit schematics for the realization of the photo sensor of the invention, wherein the photodiode is an integrated part of a single monolithic circuit.
Figure 1B:
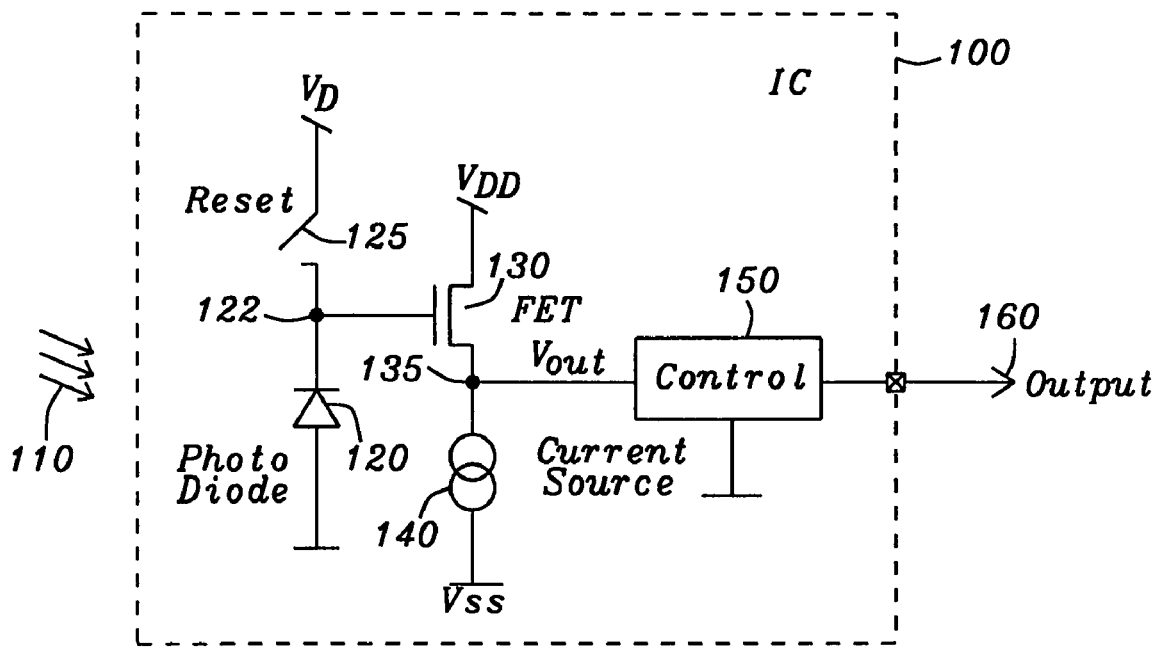

Referring now to FIG. 1B, a description of the photo sensor circuit according to the invention is given. The photon sensing device, named as Photo Diode—item 120—is connected in reverse direction from ground ($V_{SS}$) via a switching device designated Reset—item 125—to a supply voltage $V_D$, the voltage from the connection point 122 is then fed to the gate of a field effect transistor FET—item 130—, which connects on one side to a supply voltage $V_{DD}$, and on the other side to a driving current (Current Source)—item 140—itself connected to ground potential. This voltage signal $V_{out}$ is (in general: nonlinearly) proportional to the light intensity—item 110—the photo diode is exposed to. The combination of FET 130 and current source 140 thus effectively replaces the operational amplifier used in FIG. 1A prior art together with its feedback network, thus eliminating the need for resistor R and capacitor C of FIG. 1A prior art. This results in smaller chip areas needed. Said voltage signal $V_{out}$ at point 135 is then fed into a circuit block designated Control—item 150—which delivers the final output signal—item 160. The advantages of integrating the photon sensing device into the circuit—item 100—are manifold: no parasitic capacitances due to pads/pins are introduced, the necessary overall chip area is reduced, the die area for the photo diode/diodes itself is reduced, the compensation of temperature drift and light/dark currents can be effectively realized, which will be explained later in more detail, see description to FIG. 5.

Figure 2:
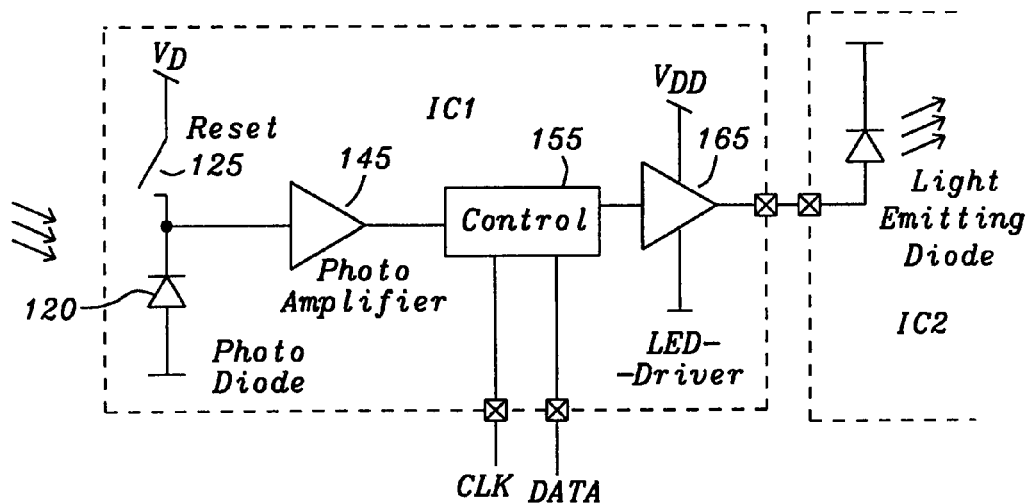
FIG. 2 depicts the general electrical circuit diagram of a complete optical closed loop control system, operating with visible or invisible light and realized with the photo sensor of the invention, wherein the photodiode is an integrated part of a single monolithic circuit.

Regarding now FIG. 2, a circuit diagram of a complete optical control system is depicted, realized with the photo sensor according to the invention, where the photon sensing input device is shown as an integrated Photo Diode 120 within a single monolithic integrated circuit (IC1), connected to both a switching device named Reset 125 and a Photo Amplifier 145 with downstream data processing for temperature drift, ageing and ambient light compensation means assembled within a Control circuit 155 and an LED—Driver circuit 165, all that formed on a single chip (IC1), whose output signal is then driving as radiation source an LED (Light Emitting Diode), still separately connected via pads/pins as discrete component (IC2). The function of the Reset switch is essential for the intrinsic compensation purposes. The reset switch will bring back the photon current integrating amplifier to its starting position every time it's operated. Additionally may the gain can be modified with this reset timing. The Photo Amplifier 145 contains mainly a field effect transistor and a current source, which can easily be seen when comparing to FIG. 1B. Yet other read out circuits are also possible e.g. a resistor or current feed back or the photo diode can work also as MOS diode. This will result in a system with a higher dynamic range. These components make up a complete optical closed loop control system, operating either with visible or invisible (e.g. infrared, IR) light.

Figure 3:
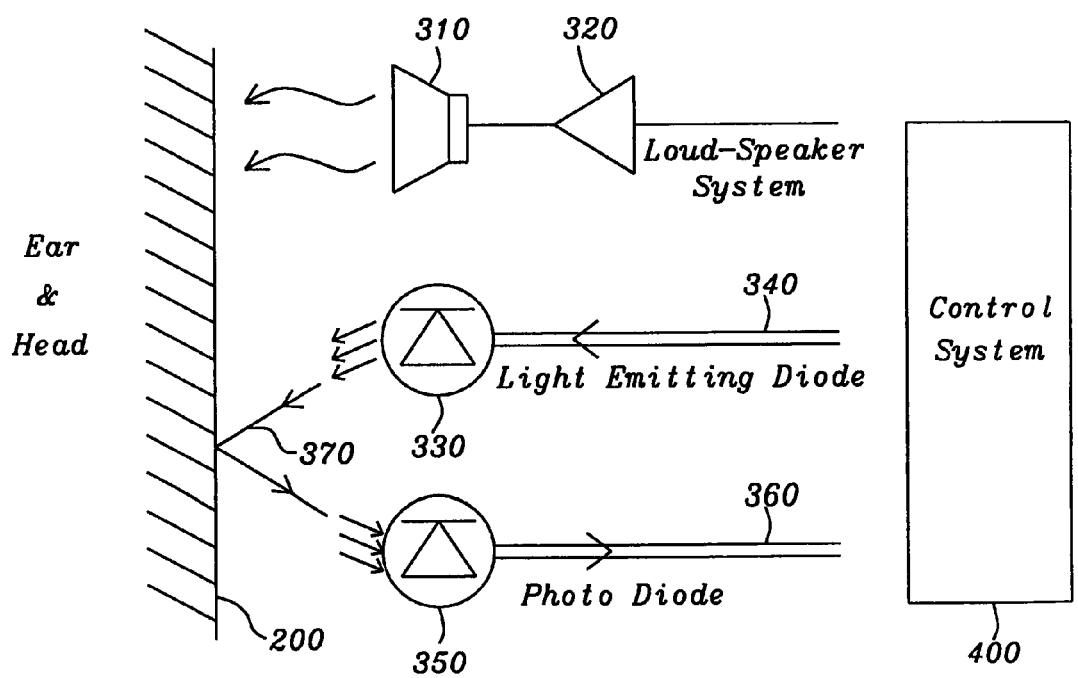
FIG. 3 illustrates the functional block diagram with the components used for the preferred embodiment of the present invention.

Referring now to FIG. 3, a preferred embodiment of the circuit of the present invention in a specific application is illustrated. Before dwelling into the details some introductory remarks shall be made. Modern telecommunication equipment demands the utmost in design and fabrication skills. Many current cellular telephones offer loud-speaking and hands-free capabilities and can provide up to 500 mWatt of output power to the loudspeaker. If the main earpiece is used as the loudspeaker for such a hands-free application or as a high power sounder—especially together with polyphonic ring tones and the required high quality sound output—there is the possibility of a high sound level emission whilst the phone is very close to the user's ear. Besides being very unpleasant to the user this may also seriously damage the ear. To overcome this difficult situation a proximity sensor can be built into the phone, located in vicinity to the earpiece and pointing towards head and ear, which detects when the phone is held close to the body. This detector is then used in a closed control loop operating together with the driver of the loudspeaker to reduce the power of the sound output to a safe level, when the user is near to the earpiece. The essential functional components of the solution according to the invention are shown in FIG. 3 in the form of a schematic block diagram. The view on this figure serves mainly for an explanation of the function of the circuit of the invention. On the left side—symbolically shown as reflecting matter with its surface (hatched), item 200—Ear and Head of the user are shown. A loudspeaker—item 310—directed towards the user's head, with its corresponding amplifier—item 320—is constituting the Loudspeaker System and is depicted in the upper segment, underneath followed by the two parts forming the photo-electric guard circuit—a Light Emitting Diode—item 330, with its control channel 340—and a Photo Diode—item 350, with its control channel 360. The reflections 370 from the infrared light coming back from the surface of the user's head are evaluated in the Control System 400, where all the control channels are gathered and also the loudness is appropriately controlled.

Figure 4:
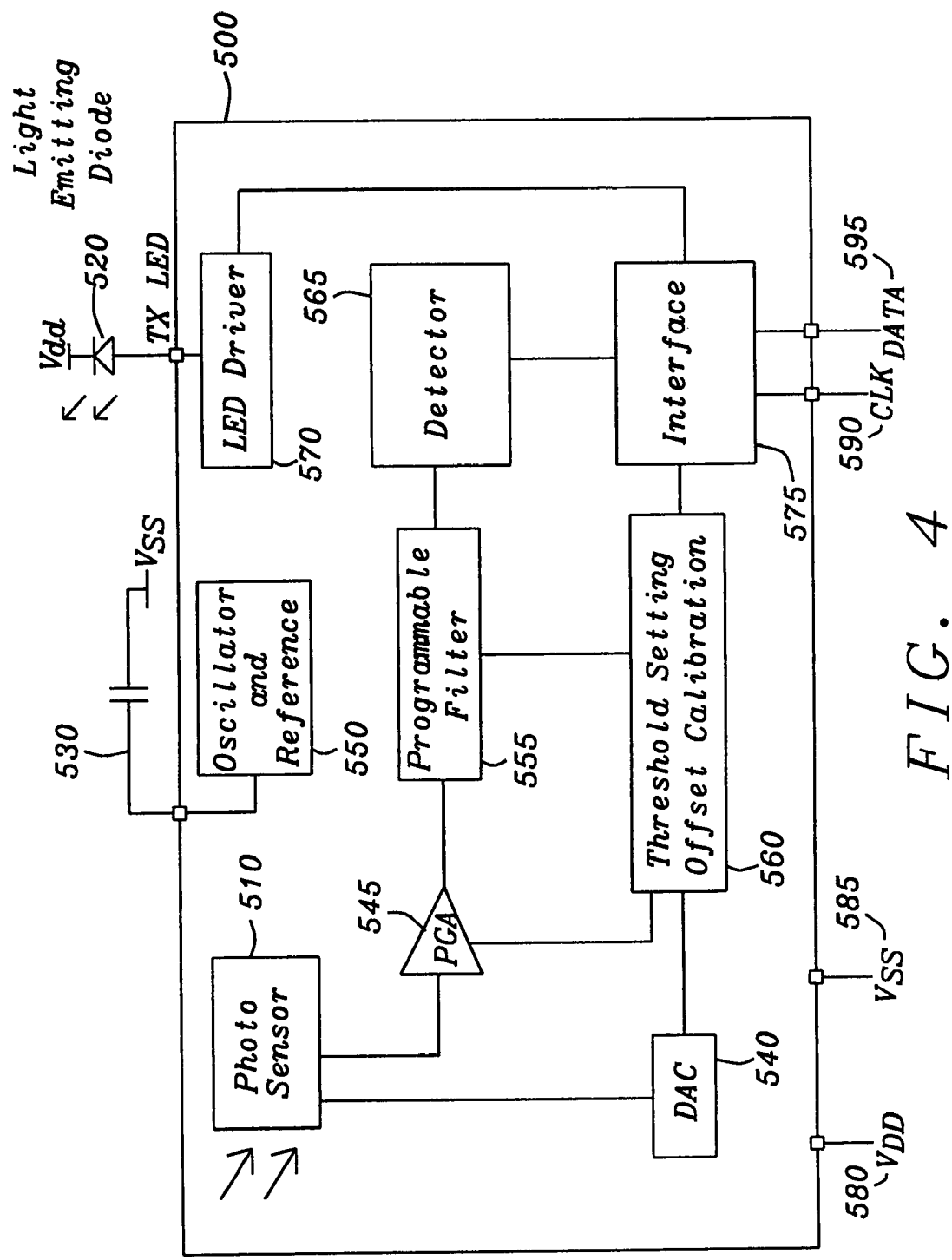
FIG. 4 shows the electrical circuit in form of a functional block diagram for a specific preferred embodiment of the present invention.

Regarding now FIG. 4, illustrating the assembly of a monolithic integrated circuit 500 as preferred embodiment of the present invention we find the integrated Photo Sensor 510, connected via its control channel to a Digital Analog Converter (DAC) 540 and a Programmable Gate Array (PGA) 545, which on its part is connected to a Programmable Filter 555 and a Threshold Setting and Offset Calibration block 560. The latter is also wired to the DAC 540. The Programmable Filter 555 feeds its signal into a Detector block 565 which operates together with an Interface block 575, which is in turn delivering control signals to the LED driver circuit 570 for driving the external Light Emitting Diode 520,—via pad TX LED—connected also to supply voltage $V_{DD}$. Interface block 575 is again connected to said Threshold Setting and Offset Calibration block 560. The Interface block 575 is externally connected to a CLK line 590 and a DATA line 595. The integrated circuit 500 includes furthermore an internal Oscillator and Reference circuit block 550, which uses one external capacitor 530, connected to ground ($V_{SS}$). Two additional pads are needed for the chip, one for the supply voltage $V_{DD}$,—item 580—and one for ground ($V_{SS}$),—item 585. As can be seen, very few external components are needed; the integrated circuit including the Photo Sensor—preferably consisting of infrared (IR) photo diodes—can be integrated as a complete system on one CMOS chip. The circuit transmits pulses of IR light at high frequency (e.g. 30 kHz) that are reflected off the body and detected by an on chip sensor. The sensor has a programmable calibration feature to remove electrical offsets within the system and also correct for ambient light conditions. The LED current is also programmable between appr. 5 mA and 30 mA.

Figure 5:
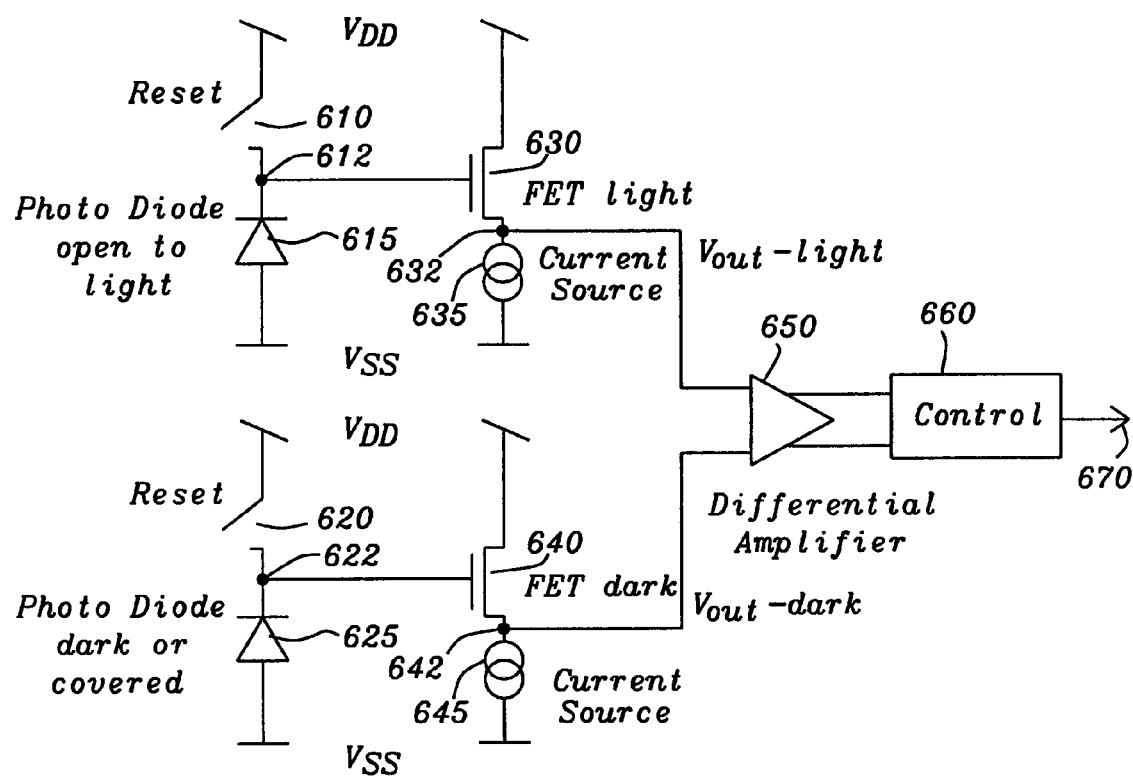
FIG. 5 shows the electrical circuit schematics for a photo sensor stage in the preferred embodiment of the present invention, where two photoactive channels are implemented, allowing for drift and offset compensation, and wherein the photodiodes are integrated parts of a single IC.

FIG. 5 depicts the circuit for offset calibration and ambient light compensation in more detail as described and explained before. Basically two identical photo sensor channels are built, made-up essentially of the components already described in FIG. 1B. One channel is equipped with a Photo Diode open to light 615 and its according FET, named $FET_{light}$ 630 and Current Source 635, the other channel is equipped with a Photo Diode dark or covered 625 and its according FET, named $FET_{dark}$ 640 and Current Source 645. Thus said basically identical photo sensor channels are demanding for identical distances between source device and related sensor devices and identical spatial locations of said sensor devices in order to behave identically with respect to their basic characteristics. But they also exhibit unequal spectral responses because of their "open to light" and their "dark or covered" features. Said distances being measured from one single photon source or a twin pair of photo sources to said Photo Diode open to light 615, as a first photo sensor defining a first photo sensor channel and to said Photo Diode dark or covered 625, as a second photo sensor defining a second photo sensor channel whereby both, said single photon source or said twin pair of photon sources as well as both photo sensors have to be located close to each other and so a common photonic or light beam is transmitted between said source or said sources and both of said photo sensors, thus forming two photo sensor channels with identical channel characteristics but different spectral responses as determined by either a Photo Diode open to light or a Photo Diode dark or covered and operating in parallel, especially with respect to the ambiance conditions at this spatial location. Said first photo sensor channel is named light channel and said second photo sensor channel is named dark channel, this naming relates to the different spectral response each channel is exhibiting. Both channels also use their respective switching devices named Reset,—items 610 and 620—connected together respectively with the Photo Diodes and the gates of the FETs, points 612 and 622 respectively. The output signals, $V_{Out\_light}$ (at point 632) from said light channel and $V_{Out\_dark}$ (at point 642) from said dark channel are now continuously compared within a Differential Amplifier 650, feeding its output signals into a signal processing circuit block 660, named Control. Continuously comparing within said Differential Amplifier 650 signifies having at any given moment in time an analog output signal describing the difference from said light and said dark, but otherwise basically identical photo channels. It shall be mentioned also, that continuously comparing can also be realized using digital techniques with synchronized pulses. Then the received signals are processed, comparing the background light condition when the LED is off against the reflected light condition when the LED is transmitting. This latter comparison is thus made from two different periods in time, a period when the LED is off and a period when the LED is transmitting. Thus temperature compensation is feasible. The difference between these two signals is used to determine a distance from the phone to the user, in the above application with the mobile phone for instance, and if said distance is equal or less than a given and programmed threshold, the device outputs a control signal to reduce the volume to a safe level. The underlying procedure for distance measuring shall be designated as distance determination with optical autocompensation by double comparison. There are several operational variations and additions possible, when said side effects are to be considered: e.g. the first (light) diode operating as an active diode and making the photon current integration of this part only when the LED is not active, the ambient light can be compensated for by using only this one diode. This can thus be done by operating in a time multiplex mode with one diode. Using a second diode (covered with metal) we can have an idea of the temperature of the system, which can then be accounted for.

The device is configured to consume the minimum current necessary and the device may be enabled only when loud speaking or ringing is to take place to further save power. For simplicity and lowest cost the device has a simple programmable threshold level at which point a warning signal is generated. It is also possible for the detector to output either an analog signal or a digital word, corresponding to the distance, if a more sophisticated system is required. In addition to the loudspeaking application the sensor could be used to control the display backlight as a power saving function, turning off the backlight of the display, when the phone is close to the ear and the display cannot be seen—which is also a security feature. Alternatively the response of the sensor could be set to also include visible light spectra and so provide a light measurement, which could be used to modify the display backlight to save power under high ambient light conditions.

Furthermore the device can be used in various other fields of applications. Not claiming for any completeness, there shall be mentioned:

Mobile phone to computer data links
Computer to computer data links
Computer to peripheral data links
Computer to television set data links
Any data link whatsoever e.g. with additional power regulation
Radiation (light) intensity measurements e.g. in photo copiers
Any visible or invisible radiation intensity measurements
Reflection measurements in printers e.g. for paper color compensation
Position detection systems e.g. in laboratory handling equipments
Every reflection measurements with visible or invisible light spectra.

Figure 6:
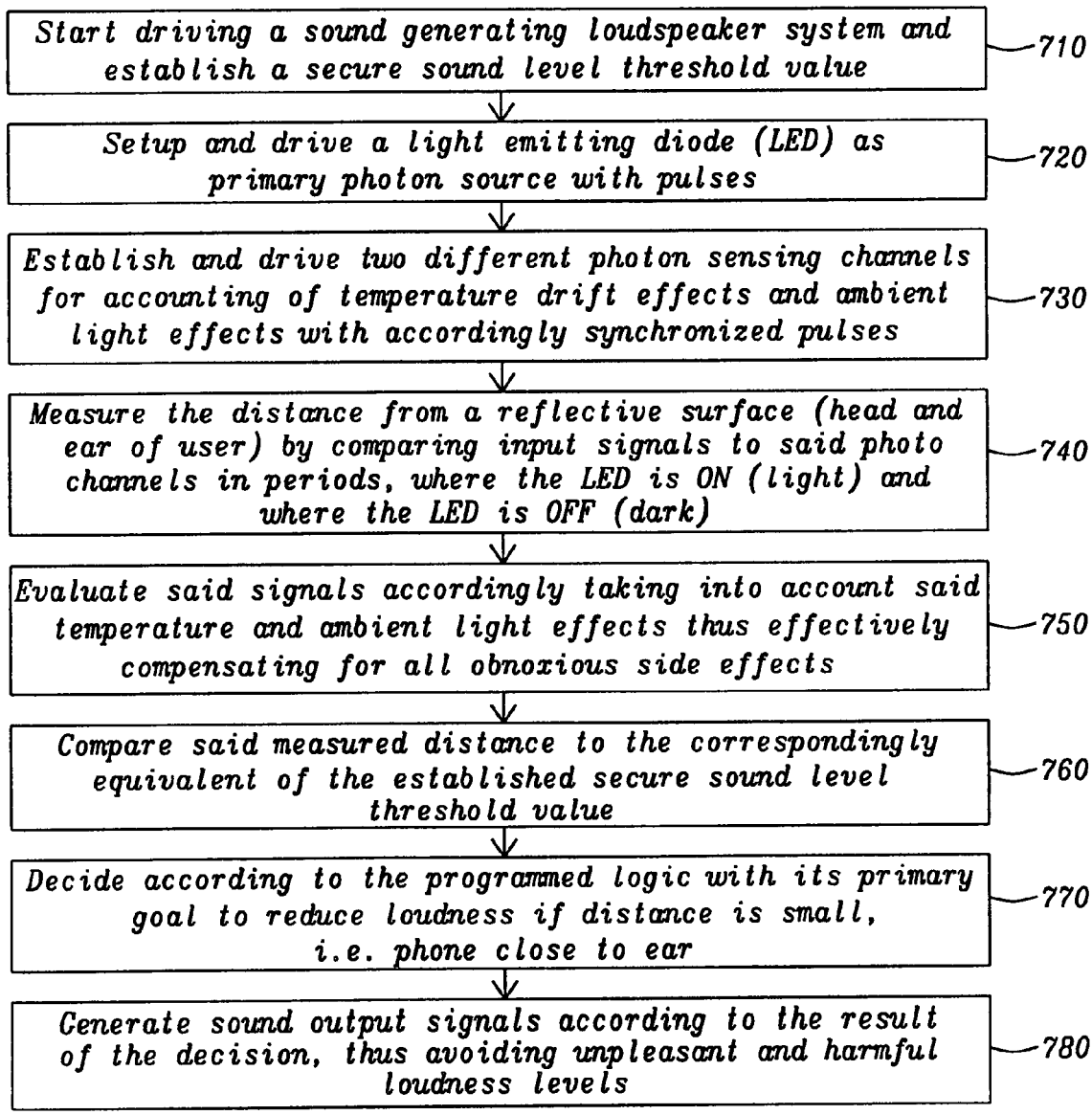
FIG. 6 illustrates the method how to accomplish the controlling of the loudness of an earpiece of a mobile phone in such a way, that unpleasant and harmful loudness levels are avoided for the user by exploiting an optical proximity sensing method with the circuit of the invention.

FIG. 6 illustrates a method how to realize the loudness control with the circuit of the invention, as described and explained before. As a first step 710 starts driving a sound generating loudspeaker system and establish a secure sound level threshold value. In the next step 720 setup and drive a light emitting diode (LED) as primary photon source with pulses. In the following step 730 establish and drive two different photon sensing channels for accounting of temperature drift effects and ambient light effects with accordingly synchronized pulses. Continuing with step 740 measure the distance from a reflective surface by comparing input signals to said photo channels in periods, where the LED is ON (light) and where the LED is OFF (dark). Now in step 750, evaluate said signals accordingly taking into account said temperature and ambient light effects thus effectively compensating for all obnoxious side effects. Within step 760, now compare said measured distance to the correspondingly equivalent of the established secure sound level threshold value. As a result in step 770, decide according to the programmed logic with its primary goal, to reduce loudness if distance is small, i.e. phone close to ear. Finally in step 780 generate sound output signals according to the result of the decision, thus avoiding unpleasant and harmful loudness levels.

As shown in the preferred embodiments, this novel circuit provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A circuit, capable of detecting and sensing photons under consideration of side effects such as temperature changes, drift, aging and ambient light influences thus generating an appropriately corrected output signal of the circuit, and having an optical input facility and an output terminal as well as terminals for supply voltages and ground connections, comprising:
   two sets of a basic photo sensitive circuit being operated in parallel to each other, one set in light mode and the other in dark mode; each set comprising:
   a photo diode connected to both the gate input of a field effect transistor and to one contact of a switching device;
   said switching device also connected to said supply voltage;
   said field effect transistor connected with its drain input to said supply voltage and connected with its source input to both a current source and an amplifier input;
   said current source also connected to ground; and
   a common differential amplifier used commonly for both sets thus having two of said amplifier inputs and outputs; with
   a common control circuit for the processing of the signals delivered from said outputs of said operational amplifier, thus generating said appropriately corrected output signal of the circuit.

2. The circuit according to claim 1 representing an essential part of implementing a mobile phone to computer data link.

3. The circuit according to claim 1 representing an essential part of implementing a computer-to-computer data link.

4. The circuit according to claim 1 representing an essential part of implementing a computer to peripheral data link.

5. The circuit according to claim 1 representing an essential part of implementing a computer to television set data link.

6. The circuit according to claim 1 representing an essential part of implementing a data link with additional power regulation features.

7. The circuit according to claim 1 representing an essential part of implementing a radiation intensity measurement system.

8. The circuit according to claim 1 representing an essential part of implementing a reflection measurement system.

9. The circuit according to claim 1 representing an essential part of implementing a position detection system.

10. The circuit according to claim 1 representing an essential part of implementing a reflection measurement system with visible or invisible light spectra.

11. The circuit according to claim 1 manufactured in monolithic integrated technology.

12. The circuit according to claim 11 manufactured in monolithic integrated CMOS technology.

13. The circuit according to claim 12 manufactured in monolithic integrated CMOS circuit technology with additional deep N-well technology features.

14. The circuit according to claim 12 manufactured in monolithic integrated CMOS circuit technology with additional deep P-well technology features.

15. The circuit according to claim 12 manufactured in monolithic integrated CMOS technology with additional triple well technology features.

16. The circuit according to claim 12 wherein said means for photon sensing is manufactured in N-well technology together with some kind of guard ring.

17. The circuit according to claim 12 wherein said means for photon sensing is manufactured in P-well technology together with some kind of guard ring.

18. A circuit manufactured as an integrated circuit formed on a single chip, capable of detecting and sensing photons under consideration of side effects such as temperature changes, drift, aging and ambient light influences thus generating an appropriately corrected output signal of the circuit, and having an optical input facility and an output terminal as well as terminals for supply voltages and ground connections, comprising:
   two sets of a basic photo sensitive circuit being operated in parallel to each other, one set in light mode and the other in dark mode; each set comprising:
   a photo diode connected to both the gate input of a field effect transistor and to one contact of a switching device;
   said switching device also connected to said supply voltage;
   said field effect transistor connected with its drain input to said supply voltage and connected with its source input to both a current source and an amplifier input;
   said current source also connected to ground; and
   a common differential amplifier used commonly for both sets thus having two of said amplifier inputs and outputs; with
   a common control circuit for the processing of the signals delivered from said outputs of said operational amplifier, thus generating said appropriately corrected output signal of the circuit.

19. The circuit according to claim 18 manufactured in monolithic integrated CMOS technology.

20. The circuit according to claim 19 manufactured in monolithic integrated CMOS circuit technology with additional deep N-well technology features.

21. The circuit according to claim 19 manufactured in monolithic integrated CMOS circuit technology with additional deep P-well technology features.

22. The circuit according to claim 19 manufactured in monolithic integrated CMOS technology with additional triple well technology features.

23. The circuit according to claim 19 wherein said means for photon sensing is manufactured in N-well technology together with some kind of guard ring.

24. The circuit according to claim 19 wherein said means for photon sensing is manufactured in P-well technology together with some kind of guard ring.

* * * * *